(12) United States Patent
Guironnet et al.

(10) Patent No.: US 11,492,424 B2
(45) Date of Patent: Nov. 8, 2022

(54) METHOD OF PREPARING SOLUBILIZED CATALYST COMPLEX, THE SOLUBILIZED CATALYST FORMULATION, AND METHOD OF CATALYTIC OLEFIN POLYMERIZATION

(71) Applicant: The Board of Trustees of the University of Illinois, Urbana, IL (US)

(72) Inventors: Damien Guironnet, Urbana, IL (US); Camille Boucher-Jacobs, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/270,660

(22) PCT Filed: Sep. 26, 2019

(86) PCT No.: PCT/US2019/053080
§ 371 (c)(1),
(2) Date: Feb. 23, 2021

(87) PCT Pub. No.: WO2020/072266
PCT Pub. Date: Apr. 9, 2020

(65) Prior Publication Data
US 2022/0056166 A1 Feb. 24, 2022

Related U.S. Application Data

(60) Provisional application No. 62/740,545, filed on Oct. 3, 2018.

(51) Int. Cl.
*C08F 4/70* (2006.01)
(52) U.S. Cl.
CPC ........ *C08F 4/7031* (2013.01); *C08F 2410/01* (2013.01)
(58) Field of Classification Search
None
See application file for complete search history.

(56) References Cited

U.S. PATENT DOCUMENTS

| | | | |
|---|---|---|---|
| 6,060,569 A | 5/2000 | Bennett et al. | |
| 6,958,255 B2 | 10/2005 | Khuri-Yakub | |
| 7,030,255 B2 | 4/2006 | Grey et al. | |
| 7,276,464 B2 | 10/2007 | Le-Khac | |
| 8,110,519 B2 | 2/2012 | Kobayashi et al. | |
| 8,318,967 B2 | 11/2012 | Koyayashi et al. | |
| 8,563,753 B2 | 10/2013 | Screen et al. | |
| 8,785,665 B2 | 7/2014 | Berl | |
| 8,828,902 B2 | 9/2014 | Ramarao | |
| 9,399,211 B2 | 7/2016 | Pears | |
| 2005/0201925 A1 | 9/2005 | Le-Khac et al. | |
| 2006/0167147 A1 | 7/2006 | Asgari et al. | |
| 2007/0173602 A1 | 7/2007 | Brinkman et al. | |
| 2016/0145464 A1 | 5/2016 | Gibbs et al. | |
| 2016/0304678 A1 | 10/2016 | Moravek | |
| 2020/0223957 A1* | 7/2020 | Guironnet | C08F 10/02 |

FOREIGN PATENT DOCUMENTS

| | | |
|---|---|---|
| EP | 1693105 A1 | 8/2006 |
| WO | 2004087772 A1 | 10/2004 |

OTHER PUBLICATIONS

Asua, Jose M., "Miniemulsion polymerization", Prog. Polym. Sci., vol. 27, 2002; pp. 1283-1346.
Bastero, A. et al., "Catalytic Ethylene Polymerization in Aqueous Emulsion Catalyst Tailoring and Synthesis of Very Small Latex Particles", First published in: Polymeric Materials: Science & Engineering, vol. 90, 2004; pp. 740-741.
Bauers F. M. et al., "High Molecular Mass Polyethylene Aqueous Latexes by Catalytic Polymerization"; Angewandte Chemie, International Edition, Wiley-VCH, DE, vol. 40, Issue No. 16; Aug. 15, 2001; pp. 3020-3022.
Bauers, F. M. et al., "Catalytic Polymerization in Emulsion", First published in : Macromolecular Chemistry and Physics, vol. 204, 2003; F7-F8.
Boucher-Jacobs et al., "Encapsulation of catalyst in block copolymer micelles for the polymerization of ethylene in aqueous medium", Nature Communications, vol. 19, No. 1; Feb. 26, 2018; pp. 1-9.
Claverie, J. P., "Catalytic polymerizations in aqueous medium", Prog. Polym. Sci., vol. 28, 2003; pp. 619-662.
Godin et al., "Aqueous Dispersions of Multiphase Polyolefin Particles", Macromolecules, vol. 49, 2016; pp. 8296-8305.
Godin et al., "Nanocrystal Formation in Aqueous Insertion Polymerization", Macromolecules, vol. 49, 2016; pp. 8825-8837.
Gottker-Schnetmann, "Water-Soluble Salicylaldimanto Ni(II)-Methly Complexes: Enhanced Dissociative Activation for Ethylene Polymerization with Unprecedented Nanoparticle Formation," JACS Communications, vol. 128 No. 24, 2006; pp. 7708-7709.
International Preliminary Report on Patentabilty for International Application No. PCT/US2018/047083; International Filing Date: Aug. 20, 2018; dated Dec. 6, 2019; 13 pages.
International Search Report and Written Opionion for International Application No. PCT/US2019/053080; International Filing Date: Sep. 26, 2019; dated Jan. 24, 2020; 14 pages.
International Search Report for International Application No. PCT/US2019/053080; International Filing Date Sep. 26, 2019; dated Jan. 24, 2020; 5 pages.
International Search Report for International Application PCT/US2018/047083, International Date of Filing: Aug. 20, 2018, dated Jan. 2, 2019; 6 pages.

(Continued)

*Primary Examiner* — Yun Qian
(74) *Attorney, Agent, or Firm* — Cantor Colburn LLP

(57) ABSTRACT

The inventors have discovered a method of comprising formation of water soluble catalyst precursor by combining a Group 8 to Group 11 transition metal containing catalyst and a surfactant. The surfactant is characterized by the presence of a hydrophobic segment and a hydrophilic segment. It is believed that the surfactant replaces the labile ligand on the catalyst precursor structure by simple ligand substitution. The precursor is then contacted with one or more monoethylenically unsaturated monomers under polymerization conditions to form a polymer.

7 Claims, No Drawings

(56) References Cited

OTHER PUBLICATIONS

Korthals et al., "Nickel(II)-Methyl Complexes with Water-Soluble Ligands L [(salicylaldiminato-K2N,O)NiMe(L)] and Their Catalytic Properties in Disperse Aqueous Systems", Organometallics, vol. 26, 2007; pp. 1311-1316.
Mecking, S. et al., "Transition Metal-Catalyzed Polymerization in Aqueous Systems", Late transition Metal Polymerization Catalysis, 2003; pp. 231-278.
Mecking, S. et al., "Aqueous Catalytic Polymerization of Olefins", Angew. Chem. Int. Ed., vol. 41, 2002; pp. 544-561.
Nakamura, A. et al., "Coordination—Insertion Copolymerization of Fundamental Polar Monomers", Chem. Rev., vol. 109, 2009; pp. 5215-5244.
Sauca et al., "Catalytic polymerization of ethylene in aqueous media", Chemical Engineering Journal, vol. 168, 2011; pp. 1319-1330.
Soula, R. et al., "Catalytic Copolymerization of Ethylene and Polar and Nonpolar a-Olefins in Emulsion", Macromolecules, vol. 35, 2002; pp. 1513-1523.
Zhang et al., "Water-Soluble Complexes [(K2-P,O-Phosphinesulfonato)PdMe(L)] and Their Catalytic Properties", Organometallics, vol. 28, 2009; pp. 4072-4078.
Zhang et al.,"Core-Shell Nanoreactors for Efficient Aqueous Biphasic Catalysis"; Chemistry—A European Journal, vol. 20, Issue No. 47; Oct. 3, 2014; p. 15505-15517.
Van Oers, Matthijs C.M. et al.,"Aquesous assymmetric cyclopropanation reactions in polymersome membranes", Chem. Commun., vol. 50, 2014; pp. 4040-4043.
Wehrmann, P. et al., "Copolymerization of Ethylene with 1-Butene and Norbornene to Higher Molecular Weight Copolymers in Aqueous Emulsion", Macromolecules, vol. 39, 2006; pp. 5995-6002.
Written Opinion for International Application No. PCT/US2018/047083; International Filing Date: Aug. 20, 2018; dated Jul. 29, 2019; 9 pages.
Written Opinion for International Application PCT/US2018/047083, International Date of Filing Aug. 20, 2018, dated Jan. 2, 2019, 10 pages.
Yu et al., "Synthesis of Aqueous Polyethylene Dispersions with Electron-Deficient Neutral Nickel(II) Catalysts with Enolatoimine Ligands", Macromolecules, vol. 40, 2007; pp. 421-428.
Yu et al., "Variable Crystallinity Polyethylene Nanoparticles", Macromolecules, vol. 42, 2009; pp. 3669-3673.

* cited by examiner

METHOD OF PREPARING SOLUBILIZED CATALYST COMPLEX, THE SOLUBILIZED CATALYST FORMULATION, AND METHOD OF CATALYTIC OLEFIN POLYMERIZATION

CROSS-REFERENCE TO RELATED APPLICATIONS

This application is a National Stage application of PCT/US2019/053080, filed Sep. 26, 2019, which claims benefit of U.S. Application No. 62/740,545 filed on Oct. 3, 2018, both of which are incorporated by reference herein in their entirety.

FIELD OF THE INVENTION

This invention relates to olefin polymerization using a catalyst solubilized with a surfactant.

BACKGROUND OF THE INVENTION

Catalytic polymerization of olefins and emulsion polymerization processes are used in the production of polymers. The early transition metal catalysts typically used for olefin polymerization are extremely water sensitive, meaning the catalyst is unstable in the presence of water, and these catalysts are therefore unsuitable for emulsion polymerization processes. The incompatibility of the early transition metal catalysts for aqueous processes is a technical challenge. There is an interest in industrial community to develop catalysts that can enable direct synthesis of semi-crystalline polyolefin latexes in aqueous environments.

Olefin polymerization processes catalyzed by late transition metals offer unique opportunities, since these metals are less oxophilic than their early transition metal counterparts and are therefore more stable in the presence of water. Despite the apparent water stability of the late-transition metal catalysts, the productivities of these catalysts in water are lower than those in organic solvents. This low activity may be due to fast deactivation of the catalyst by water. Attempts have been made to improve the stability of catalysts by encapsulating a pre-catalyst in nanometer size hydrophobic droplets stabilized by large amounts or surfactants (miniemulsion) or in polymeric based micelles. See e.g. Soula, R.; Novat, C.; Tomov, A.; Spitz, R.; Claverie, J.; Drujon, X.; Malinge, J.; Saudemont, T. Catalytic Polymerization of Ethylene in Emulsion. Macromolecules 2001, 34 (7), 2022-2026. Bastero, A.; Kolb, L.; Wehrmann, P.; Bauers, F.; Göttker-Schnetmann, I.; Monteil, V.; Thomann, R.; Chowdhry, M.; Mecking, S. Catalytic Ethylene Polymerization in Aqueous Emulsion: Catalyst Tailoring and Synthesis of Very Small Latex Particles. Polym Mater Sci Eng 2004, 90, 740-741. Mecking, S.; Claverie, J. Transition Metal Catalyzed Polymerization in Aqueous Systems. In Late Transition Metal Polymerization Catalysis; Boffa, L. S., Kacker, S., Rieger B., Striegler, S., Eds.; Wiley-VCH, 2003; pp 231-278. Bauers, F. M.; Mecking, S. High Molecular Mass Polyethylene Aqueous Latexes by Catalytic Polymerization. Angewandte Chemie International Edition 2001, 40 (16), 3020-3022. Soula, R.; Saillard, B.; Spitz, R.; Claverie, J.; Llaurro, M. F.; Monnet, C. Catalytic Copolymerization of Ethylene and Polar and Nonpolar α-Olefins in Emulsion. 2002. Bauers, F. M.; Zuideveld, M. A.; Thomann, R.; Mecking, S. Catalytic Polymerization in Emulsion. Macromol. Chem. Phys. 2003, 204, F7-F8. Wehrmann, P.; Mecking, S. Aqueous Dispersions of Polypropylene and Poly(1-Butene) with Variable Microstructures Formed with Neutral Nickel(II) Complexes. Macromolecules 2006, 39 (18), 5963-5964. Claverie, J. P.; Soula, R. Catalytic Polymerizations in Aqueous Medium. Progress in Polymer Science (Oxford). April 2003, pp 619-662. Mecking, S.; Held, A.; Bauers, F. M. Aqueous Catalytic Polymerization of Olefins. Angewandte Chemie International Edition 2002, 41 (4), 544-561. Asua, J. M. Miniemulsion Polymerization. Progress in Polymer Science 2002, 27 (7), 1283-1346., and Boucher-Jacobs, C.; Rabnawaz, M.; Katz, J. S.; Even, R.; Guironnet, Encapsultation of Catalyst in Block Copolymer Micelles for the Polymerization of Ethylene in Aqueous Medium, D. Nat. Commun. 2018, 9 (1), 841. Alternatively, aqueous soluble complexes as catalyst precursors have been proposed using amine terminated polyethylene glycols (PEG) or sulfonated aryl phosphines as hydrophilic ligands. See e.g. Zhang, D.; Guironnet, D.; Göttker-Schnetmann, I.; Mecking, S. Water-Soluble Complexes [(κ 2-P,O-Phosphinesulfonato)PdMe(L)1 and Their Catalytic Properties. Organometallics 2009, 28 (14), 4072-4078. Godin, A.; Mecking, S. Aqueous Dispersions of Multiphase Polyolefin Particles. Macromolecules 2016, 49 (21), 8296-8305. Godin, A.; Göttker-Schnetmann, I.; Mecking, S. Nanocrystal Formation in Aqueous Insertion Polymerization. Macromolecules 2016, 49 (23), 8825-8837. Korthals, Brigitte, I.; Mecking, S. Nickel(II)—Methyl Complexes with Water-Soluble Ligands L RSalicylaldiminato-K 2 N, O)NiMe(L)] and Their Catalytic Properties in Disperse Aqueous Systems. Organometallics 2007, No. 26, 1311-1316. Yu, S.-M.; Berkefeld, A.; Göttker-Schnetmann, I.; Müller, G.; Mecking, S. Synthesis of Aqueous Polyethylene Dispersions with Electron-Deficient Neutral Nickel(II) Catalysts with Enolatoimine Ligands. 2007, 40 (3), 421-428. Yu, S.-M.; Mecking, S. Variable Crystallinity Polyethylene Nanoparticles. Macromolecules 2009, 42 (11), 3669-3673. Sauca, S. N.; Asua, J. M. Catalytic Polymerization of Ethylene in Aqueous Media. Chemical Engineering Journal 2011, 168 (3), 1319-1330. Berkefeld, A.; Mecking, S. Mechanistic Studies of Catalytic Polyethylene Chain Growth in the Presence of Water. Angewandte Chemie International Edition 2006, 45 (36), 6044-6046. Hristov, I. H.; DeKock, R. L.; Anderson, G. D. W.; Göttker-Schnetmann, I.; Mecking, S.; Ziegler, T. Possible Side Reactions Due to Water in Emulsion Polymerization by Late Transition Metal Complexes. 1. Water Complexation and Hydrolysis of the Growing Chain. Inorganic Chemistry 2005, 44 (22), 7806-7818. However, these technologies have been hampered by low catalyst productivity in water, high cost of encapsulation and/or high cost of water soluble labile ligands.

A higher activity catalyst that can be used for aqueous catalytic polymerization of olefins, such as ethylene, in an emulsion is still needed. It is also desirable to have a catalyst with high productivity in water. There is also a need for an operationally simple and cost-efficient method for direct synthesis of semi-crystalline polyolefin latexes.

SUMMARY OF THE INVENTION

The inventors have discovered a method of comprising formation of water soluble catalyst precursor by combining a Group 8 to Group 11 transition metal containing catalyst and a surfactant. The surfactant is characterized by the presence of a hydrophobic segment and a hydrophilic segment. It is believed that the surfactant replaces the labile ligand on the catalyst precursor structure by simple ligand substitution. The precursor is then contacted with one or more monoethylenically unsaturated monomers under polymerization conditions to form a polymer. This method provides surprisingly high yields and productivity for polyethylene latex synthesis.

Thus according to one embodiment this is a method of preparing a formulation comprising combining an organic soluble Group 8 to Group 11 transition metal catalyst precursor, wherein the catalyst precursor includes a chelating ligand and a labile ligand, with a surfactant in an aqueous solution and to form a water soluble catalyst precursor. The invention is also the preceding method where the labile ligand undergoes ligand substitution with the surfactant. According to another embodiment this invention is the water soluble catalyst precursor made by the preceding method and preferably having the structure:

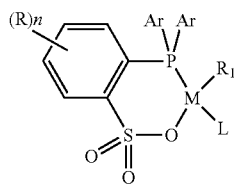

where M is a group 8 to group 11 transition metal, and is preferably Fe, Co, Ni, Cu, Ru, Rh, Pd, Ag, Os, Ir, Pt, and Au, and is most preferably Pd, $R_1$ is H or a an alkyl of 1 to 4 carbon atoms but is preferably methyl Ar is a substituted or unsubstituted aromatic group preferably having from 1 to 3 aromatic rings, and preferably at least one of the aromatic rings has alkoxy substitution wherein the alkoxy group has from 1 to 5, preferably 1 to 3 and most preferably 1 carbon atom, R is a hydrocarbon group of 1 to 12 carbon atoms, preferably an aromatic ring or an alkyl group of 1 to 5 carbon atoms, n is the number of occurrences of R and is 0, 1, or 2, preferably 0. In the catalyst precursor which is used to form the solubilized catalyst precursor L is any known ligand but is preferably DMSO (dimethyl sulfoxide), or $N(Me)_2C_6H_{13}$ ($R^1_3$) where $R^1$ is an hydrocarbyl group of 1 to 8 carbon atoms, preferably an alkyl of 1 to 5 carbon atoms.

DETAILED DESCRIPTION

The catalysts of present disclosure are late transition metal containing catalysts. Late transition metals are Group 8 to Group 11 transition metals, including Fe, Co, Ni, Cu, Ru, Rh, Pd, Ag, Os, Ir, Pt, and Au. The Group 8 to Group 11 transition metal containing catalyst precursors include complexes of the transition metals and ligands including chelating ligands such as phosphinosulfonate and nitrogen-containing compounds and labile ligands such as dimethylsulfoxide. In an embodiment, the ligands comprise aromatic rings and one or more halogens. In an embodiment, a ligand is a nitrogen-containing compound. In an embodiment, a ligand is pyridine. In an embodiment, a ligand is —NR3, where each R is the same or different and is a straight-chain or branched alkyl group having 1-10 carbon atoms. In an embodiment, —NR3 is —$N(CH_3)_2(C_5H_{11})$. In an embodiment, a ligand is a base. In an embodiment, a ligand is a Lewis base. In an embodiment, a ligand is an amine, pyridine, or phosphine. In an embodiment, a ligand is a ketone, ether, phosphine oxide, sulfoxide, alcohol, or olefin.

The Group 8 to Group 11 transition metal containing catalyst can be any Group 8 to Group 11 transition metal containing catalyst that can undergo ethylene polymerization without the need of an additional chemical activator.

One preferred catalyst precursor has the structure:

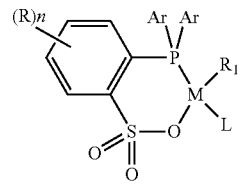

where M is a group 8 to group 11 transition metal, and is preferably Fe, Co, Ni, Cu, Ru, Rh, Pd, Ag, Os, Ir, Pt, and Au, and is most preferably Pd, $R_1$ is H or a an alkyl of 1 to 4 carbon atoms but is preferably methyl Ar is a substituted or unsubstituted aromatic group preferably having from 1 to 3 aromatic rings, and preferably at least one of the aromatic rings has alkoxy substitution wherein the alkoxy group has from 1 to 5, preferably 1 to 3 and most preferably 1 carbon atom, R is a hydrocarbon group of 1 to 12 carbon atoms, preferably an aromatic ring or an alkyl group of 1 to 5 carbon atoms, n is the number of occurrences of R and is 0, 1, or 2, preferably 0. In the catalyst precursor which is used to form the solubilized catalyst precursor, L is any known labile ligand but is preferably DMSO (dimethyl sulfoxide), or $N(Me)_2C_6H_{13}$ ($R^1_3$) where $R^1$ is an hydrocarbyl group of 1 to 8 carbon atoms, preferably an alkyl of 1 to 5 carbon atoms.

According to one preferred embodiment the catalyst precursor has the structure

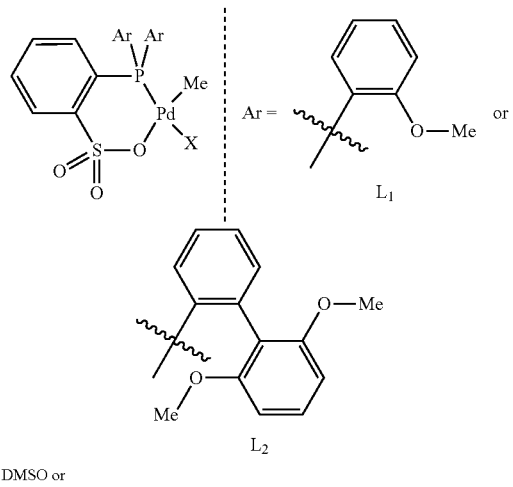

X = DMSO or
$N(Me)_2C_6H_{13}$ ($NR_3$)

In this invention the labile ligand L or X as shown in the above structures is believed to be substituted with the surfactant. This can be accomplished by ligand substitution. For example, to an aqueous solution of the surfactant, the catalyst precursor can be added. Preferably, the solution is heated and/or agitated. If heated, the solution is heated to temperatures in the range of higher than ambient temperature (e.g. 20° C.) but below 90° C. Use of DMSO as the labile ligand is preferred.

The surfactant is a group characterized by a hydrophobic segment and a hydrophilic segment. Examples of hydrophobic segments include C8-C20 straight or branched alkyl groups, C8-C15 alkyl benzene residues, naphthalene, alkylnaphthalenes, tristyrylphenol, or other water insoluble hydrocarbons. Alternatively it may be a perfluoroalkyl or a polysiloxane. According to one preferred embodiment the hydrophilic segment comprises a polyalkylyene glycol having repeat units —[—O—(CH$_2$)n-]- where n is 2, 3, or 4, but preferably 2 forming a polyethylene glycol and there are preferably at least 5, more preferably at least 10 repeat units but preferably no more than 40, more preferably no more than 20 repeat units. The hydrophobic portion is preferably a hydrocarbon group of at least 6, more preferably at least 8, most preferably at least 10 and preferably no more than 30, more preferably no more than 16 carbon atoms. According to one preferred embodiment the surfactant further includes an anionic group such as phosphate, a sulfate, a sulfonate, a phosphonate, a carboxylate, or a combination thereof. Commercially available surfactants that may be used in this invention include Tergitol™ 15 S-20 from The Dow Chemical Company and Rhodofac™ RS-610 from Solvay. Preferably, the surfactant is characterized by the absence of any amine functional groups. Another type of surfactant that may be used are alkylated sulfates, having 10 to 20 carbon atoms. One example is sodium dodecyl sulfonate.

The amount of surfactant relative to catalyst is preferably at least 0.02 grams surfactant/micromol catalyst, preferably greater than 0.04 grams surfactant/micromol catalyst, most preferably greater than 0.15 grams surfactant/micromol catalyst. Stated alternatively, the amount of surfactant in the solution is at least 3, or at least 4 or at least 5 grams/liter and preferably is no more than 100 or no more than 50 grams/liter.

The concentration of the solubilized catalyst precursor in the solution is preferably 0.01 to 21 micromoles/liter.

The stabilized catalyst can be used to perform catalytic olefin polymerization. In an embodiment, catalytic olefin polymerization is performed by contacting a stabilized catalyst with a monoethylenically unsaturated monomer under polymerization conditions to form a polyolefin. In an embodiment, the monomer is ethylene. In other embodiments, monoethylenically unsaturated monomers are ethylene, propylene, 1-butene, 1-pentene, 1-hexene, 1-heptene, 1-octene, and other 2 to 8 carbon atom-containing monoolefins. In some embodiments, more than one different monoethylenically unsaturated monomer can be used in the polymerization, for example, ethylene and propylene, or ethylene and octene. In some embodiments, one, two, or three monoethylenically unsaturated monomers can be used to form a polyolefin. The polyolefin can be a homopolymer, copolymer, or terpolymer, for example. The lower molecular weight monomers (e.g. ethylene) are normally in gaseous form and are brought into contact with the catalyst in solution in a pressurized reactor and at least some of the monomer then dissolves in the solution. Suitable pressures are preferably 30 to 160 bar. Suitable temperatures for reaction are typically in the range 60 to 100° C. It may be advantageous to be stirring or mixing the reaction solution.

Applicants have found that surprisingly the solubilized catalyst have the highest activity at lower pH. Thus, according to one embodiment the pH is less than 7, or less than 5.

The methods and catalysts described herein are further illustrated by the following non-limiting examples.

EXAMPLES

The following materials were used.

| Component | Chemical Description | Source |
|---|---|---|
| 1-Pd-L | 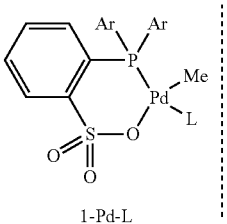 Ar = 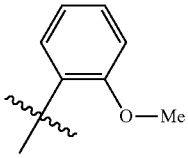 L = DMSO Pyr (pyridine NH$_2$PEG$_{52}$ | Sigma Aldrich |
| Rhodafac ™ TMRS-610 | 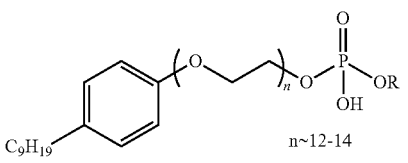 n~12-14 | Solvay |
| SDS | Sodium dodecyl sulfate | Sigma Aldrich |
| Tergitol ™ 15-S-20 | 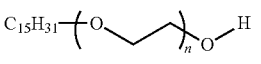 n~20 | Dow Chemical |

Example 1. Preparation of Pd Catalyst Precursors

Pd catalyst precursors were prepared according to catalysts synthesis pathway shown below:

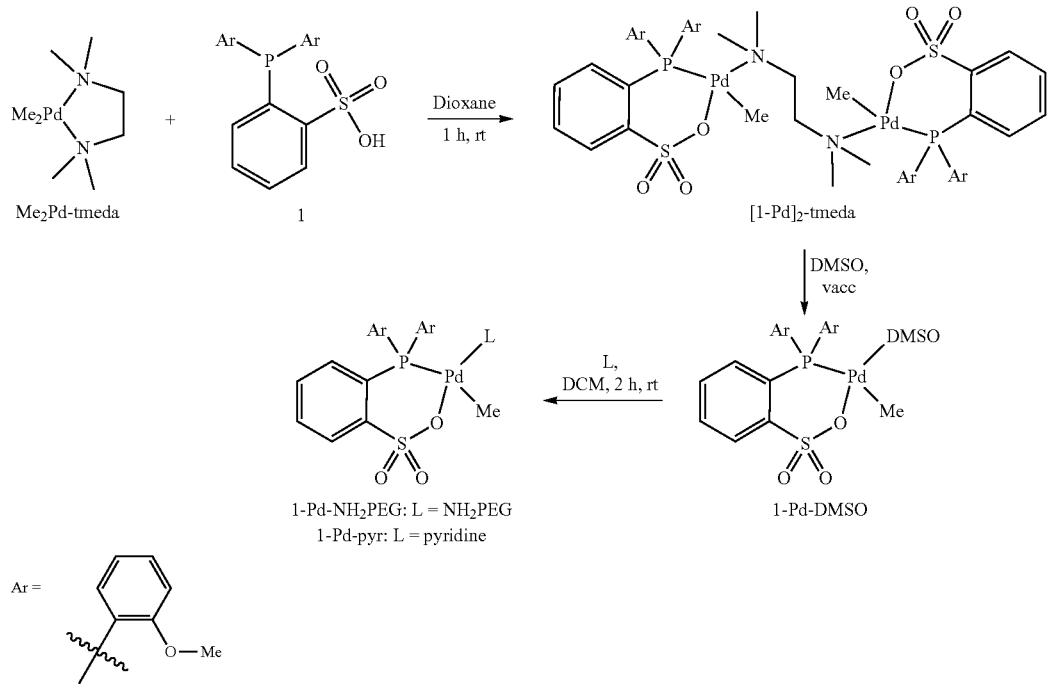

The method of preparing the catalyst precursors is described Insertion Polymerization of Acrylate, Guironnet et al., J. Am. Chem. S oc. 2009, 131(2) 422-423.

These initial catalyst precursors are soluble in organic solvents.

All manipulations of metal complexes were carried out under an inert atmosphere using glove box or Schlenk techniques. Solvents were dried and degassed. Deionized water was degassed with argon before use. Surfactant solutions in water were prepared in advance and were degassed before use. Unless otherwise stated reagents obtained from the commercial supplier were used without any purification.

Example 2. Preparation of Water-Soluble Surfactant-Stabilized Pd Catalyst

Water-soluble surfactant-solubilized catalysts were synthesized by a simple ligand exchange reaction shown below. Three surfactants were used, namely, SDS, Tergitol™ 15-S-20, and Rhodafac™ RS-610. 1-Pd-DMSO complex was used as the organic catalyst precursor. The weak coordination of the DMSO ligand was presumed to improve the yield of this ligand exchange.

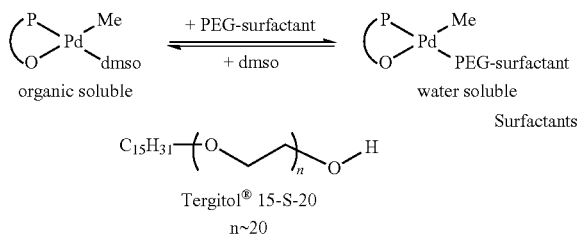

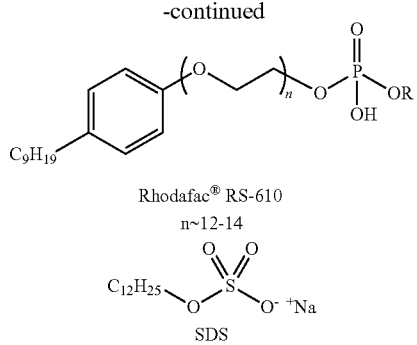

Example 3. Quantification of Solubility of Stabilized Catalyst and Catalyst Precursors A UV titration method was developed to quantify the fraction of the phosphinosulfonate palladium complex solubilized in the aqueous phase using the absorption of the aromatic ligand. A known water-soluble PEG-amine complex 1-Pd-NH2PEG dissolved in water/Rhodafac™ was used to develop a calibration curve. The maximum absorbance of the complex was determined to occur at a wavelength of $\lambda max=293$ nm. Here, the aqueous solutions used to determine the calibration contain a surfactant (Rhodafac™) to faithfully represent the aqueous solutions used to synthesize the water-soluble stabilized catalyst.

The water-soluble stabilized-catalyst solution was prepared by adding 0.1 mL of 0.02 μmol/L of 1-Pd-DMSO complex in dichloromethane (DCM) to 10 mL of an aqueous Rhodafac™ solution (8 g/L) heated to 85° C., under vigorous stirring. Upon addition, gas evolved from the solution as the volatile organic solvent was flashed out, thereby yielding a clear solution. Upon cooling, the UV/Vis absorbance spectrum of this solution was determined. Using the calibration curve, it was calculated that 99% of Pd complex was solubilized in water. Without being bound by a theory, it is hypothesized that the coordination of the palladium complex to the PEG unit of the surfactant improves the solubility.

In a series of control experiments, a new UV/Vis absorbance calibration in the absence of surfactant was determined, and the solubilization of 1-Pd-DMSO was repeated. The UV/Vis absorbance spectrum of the neat aqueous solution showed that 87% of the palladium complex was solubilized in the aqueous phase. However this experiment did not fully provide the validation for the UV titration. Therefore, the experiment was repeated using the corresponding pyridine complex (1-Pd-pyr) in place of the 1-Pd-DMSO complex. The pyridine coordinates significantly more strongly than DMSO to the metal center, and therefore, formation of a water soluble aqueous complex was expected to be less favorable. See, Guironnet, D.; Roesle, P.; Rünzi, T.; Göttker-Schnetmann, I.; Mecking, S. Insertion Polymerization of Acrylate. *Journal of the American Chemical Society* 2009, 131 (2), 422-423. Indeed, only 40% of the pyridine complex was found to be dissolved in the aqueous solution. Moreover, the resulting aqueous solution was clearly heterogeneous, highlighting the low yield of the ligand exchange with 1-Pd-pyr. Taken together, these experiments validate the UV/Vis titration method used to quantify the percentage of complex dissolved in water.

Example 4. Polymerization of Ethylene and Preparation of Polyethylene Latex

The surfactant solubilization method described above was later used to synthesize polyethylene latex by exposing the aqueous catalyst solution to ethylene. A summary of the polymerization of ethylene using various surfactants is provided in Table 1.

In particular, three different surfactants were used, namely, sodium dodecyl sulfate (SDS), an alkyl sulfonated surfactant; Tergitol™, a non-anionic PEGylated surfactant; and Rhodafac™, a phosphated PEGylated surfactant. As a control, polymerization reactions were also performed in absence of a surfactant.

Without surfactant, a polyethylene latex was formed with broad particle size distribution and a large amount of coagulated polyethylene (52% of the PE formed) was observed floating at the top of the latex. Despite this colloidal instability, the catalyst reached a turnover (TO) rate of 850 TO $h^{-1}$. See, Table 1. Note that the activities reported here do not include the polymer isolated as a coagulate.

As illustrated by the lower amount of coagulate formed, the addition of surfactants significantly improves the colloidal stability of the latex. See, Table 1. The activity of the catalyst is also dependent on the surfactant, with SDS and Tergitol™ resulting in lower activity than Rhodafac™. The pH of all polymerization reactions were set to be identical (~7), such that a small amount of cesium hydroxide was added to neutralize the Rhodafac™ solution.

Impact of the pH on the activity of the catalyst was also studied. A series of polymerization reactions at pH 3 and pH 10 was performed using the different surfactants. The results are summarized in Table 1.

TABLE 1

Polymerization of ethylene with 1-Pd—DMSO in water with various surfactants at various pH[a]

| Trial | Surfactant | pH | TO (h−1) | PSb | % Coag. | Mnc (g/mol) |
|---|---|---|---|---|---|---|
| 1 | None | 3e | 850 | 448 | 68 | |
| 2 | | 7 | 850 | 193 | 52 | 2688 |
| 3 | | 10d | 315 | 90,385 | Traces | |
| 4 | SDS | 3e | 360 | 41 | Traces | |
| 5 | | 7 | 330 | 54 | 0 | 560 |
| 6 | | 10d | — | 44,164 | 0 | |
| 7 | RhodafacTM | 3e | 1300 | 135 | 18 | |
| 8 | | 7 | 560 | 24,620 | 17 | 1708 |
| 9 | | 10d | — | 44,474 | Traces | |
| 10 | TergitolTM | 3e | 1015 | 41 | 25 | |
| 11 | | 7 | 350 | 34,481 | 63 | 2800 |
| 12 | | 10d | — | 50,363 | Traces | |

[a]Polymerization was carried out with 20 μmol catalyst loading at 85° C. in 100 mL of water for 0.5 h.
bPS is particle size determined by dynamic light scattering (DLS).
cDetermined by 1H-NMR in Cl2CDCDCl2 at 90° C.
dpH adjusted with CsOH.
epH adjusted with H3PO4 (1M).

It was observed that the activity of the phosphinosulfonate palladium catalyst is lower at higher pH with all three surfactants. The highest activity with the Rhodafac™ surfactant was observed at pH 3.

The stability of the catalyst was also probed in presence of Rhodafac™ and SDS. See Table 2. With both surfactants, the catalyst did not show any decay in activity for over 1.5 hours. In the case of Rhodafac™, only a 35% loss of activity after 6 hours of polymerization was observed. Interestingly, good stability but low activity was observed with SDS suggesting that SDS is strongly inhibiting the catalyst. This inhibition could explain the low activity previously reported for the same catalyst when implemented in miniemulsion polymerization and with water soluble precursors. See, Zhang, D.; Guironnet, D.; Göttker-Schnetmann, I.; Mecking, S. "Water-Soluble Complexes [(κ 2-P,O-Phosphinesulfonato)PdMe(L)] and Their Catalytic Properties". *Organometallics* 2009, 28 (14), 4072-4078.

TABLE 2

Polymerization of ethylene with 1-Pd-DMSO overtime[a]

| Sample # | Surfactant | Time [h] | TO | PS | % coag |
|---|---|---|---|---|---|
| S1 | Rhodafac ® | 0.5 | 660 | 160 | 18 |
| S2 | | 1 | 1260 | 286 | 20 |
| S3 | | 1.5 | 1855 | 314 | 16 |
| S4c | | 6 | 4920 | 287 | 17 |
| S5 | SDS | 0.5 | 164 | 54 | — |
| S6 | | 1.5 | 644 | 69 | — |

[a]Polymerization was carried out with 20 μmol of catalyst at 85° C. in 100 mL of water with Rhodafac ® RS-610: 0.8 g or SDS: 0.75 g
b g/mol.
c1.6 g surfactant used Dynamic light scattering (DLS) analysis of the latex made with Rhodafac™ showed that the volume of the polyethylene particles formed increases linearly with time, which is consistent with the absence of new nucleation or any coagulation. The ratio between the mass of PE formed in water and the mass of PE collected as coagulum remain constant over time. Both of these observations suggest that the particles are stable throughout the polymerization and the coagulation is caused by the presence of an insoluble catalyst fraction that remains active throughout the experiments.

Example 5. Effect of Surfactant Concentration on Activity of Catalyst

The effect of surfactant concentration on the activity of the catalyst was studied. See, Table 3.

TABLE 3

Polymerization of ethylene with 1-Pd-DMSO with various amounts of Rhodafac™[a]

| Trial | Rhodafac™TM (g/L) | TO (h−1) | Mn[b] (g/mol) | PS[b] | % coag. |
|---|---|---|---|---|---|
| 1 | 4 | 400 | 1904 | 191 | 56 |
| 2 | 8 | 1300 | 2296 | 135 | 18 |
| 3 | 16 | 1650 | 1932 | 145 | 11 |
| 4 | 30 | 1900 | — | 119 | 6 |
| 5 | 30[d] | 4040 | — | 148 | Traces |

[a]Polymerization was carried out with 20 μmol catalyst loading at 85° C. in 100 mL of water for 0.5 h.
[b]Determined by DLS.
[c]Determined by $^1$H-NMR in $Cl_2CDCDCl_2$ at 90° C.
[d]with 7 μmol of catalyst.

The addition of larger amounts of surfactant resulted in higher activity and lower amounts of coagulum, which is consistent with the coagulum being caused by a non-solubilized catalyst. Rather than continuously increasing the surfactant loading to fully solubilize the catalyst and reach a maximum activity, the catalyst loading was reduced. A polymerization reaction containing 7 μmol of catalyst (33% of the original loading) exhibited an activity of 4040 TO·h$^{-1}$ without formation of coagulum.

Properties of Polyethylene Particles

Isolated polyethylene samples made in the aqueous emulsions were analyzed by NMR spectroscopy and differential scanning calorimetry (DSC). A broad melting temperature around 110° C. and high crystallinity was observed, as determined by DSC. These thermal properties are consistent with the low molecular weights determined by $^1$H-NMR. The appearance of olefinic protons in NMR spectra implies that the ratio of the rates of chain transfer to propagation is larger in water than in organic solvents. Again, this observation generally contrasts with the polymerization behavior using salycilaldimine nickel catalysts that rarely undergoes any chain transfer in water. See, Godin, A.; Göttker-Schnetmann, I.; Mecking, S. "Nanocrystal Formation in Aqueous Insertion Polymerization". *Macromolecules* 2016, 49 (23), 8825-8837.

Transmission electron microscopy (TEM) images of latex samples show that the particles synthesized with Tergitol™ and SDS appear as an agglomeration of small particles with a rounded shape. The volume of these sub-particles (assuming a sphere) is in good agreement with the volume of a single polymer chain based on its molecular weight. Moreover, the rounded particle morphology is consistent with the hypothesis that the catalyst shuttles between the aqueous phase and the particle. The water solubility of the palladium methyl complex suggests that the corresponding palladium hydride is also water soluble, and thus, upon chain transfer, the catalyst becomes water soluble until it inserts multiple units of ethylene and collapses into PE particles. On the other hand, this morphology was not observed for Rhodafac™. Without being bound by a theory, it is conjectured that this difference occurs due to the coalescing of the sub-particles with the Rhodafac™ and not with the other surfactants.

Thus, the present inventors have surprisingly found a simple strategy for the production of semi-crystalline polyethylene latex in water. The catalyst precursors were solubilized in water by coordination to a water-soluble surfactant. Moreover, the catalyst generally exhibited high activity and high stability, with activity for over 6 hours. The chemistry of the surfactant as well as the pH of the aqueous solution were found to play a significant role in the rate of polymerization. The palladium catalysts studied here performed best under acidic pH with a phosphated surfactant. A common sulfonated surfactant, SDS, was shown, however, to strongly inhibit the catalyst.

Thus, the methods described in this disclosure provide an easy strategy for synthesis in-situ of water soluble stabilized catalyst active for olefin polymerization.

This disclosure is further illustrated by the following Aspects.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any components, materials, ingredients, adjuvants or species used in the prior art compositions or that are otherwise not necessary to the achievement of the function and/or objectives of the compositions, methods, and articles.

All ranges disclosed herein are inclusive of the endpoints, and the endpoints are independently combinable with each other. "Combination" is inclusive of blends, mixtures, alloys, or reaction products. Furthermore, the terms "first," "second," etc., herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments.

The terms "pre-catalyst" and "catalyst precursor" are used synonymously throughout this disclosure.

"Alkyl" as used herein refers to hydrocarbyl groups having 1-20 carbon atoms, preferably 2-16 carbon atoms; and "substituted alkyl" includes alkyl groups further having one or more hydroxy, alkoxy (of a lower alkyl group), mercapto (of a lower alkyl group), cycloalkyl, substituted cycloalkyl, heterocyclic, substituted heterocyclic, aryl, substituted aryl, heteroaryl, substituted heteroaryl, aryloxy, substituted aryloxy, halogen, trifluoromethyl, cyano, nitro, nitrone, amino, amido, C(O)H, acyl, oxyacyl, carboxyl, carbamate, sulfonyl, sulfonamide, or sulfuryl substituents. "Lower alkyl" refers to hydrocarbyl radicals having 1-6 carbon atoms, preferably 1-4 carbon atoms; and "substituted lower alkyl" includes lower alkyl groups further having one or more substituents as described herein. "Alkylene" refers to divalent hydrocarbyl groups having 1-20 carbon atoms, preferably 2-10 carbon atoms; and "substituted alkylene" includes alkylene groups further having one or more substituents as set forth above. "Cycloalkylene" refers to divalent cyclic ring-containing groups containing 3-8 carbon atoms, and "substituted cycloalkylene" refers to cycloalkylene groups further having one or more substituents as set forth above. "Arylene" refers to divalent aromatic groups having 6 up to 14 carbon atoms and "substituted arylene" refers to arylene groups further having one or more substituents as set forth above. "Polyarylene" refers to a divalent moiety comprising a plurality (i.e., at least two, up to 10) divalent aromatic groups (each having 6 up to 14 carbon atoms), wherein said divalent aromatic groups are linked to one another directly, or via a 1-3 atom linker; and "substituted polyarylene" refers to polyarylene groups further having one or more substituents as set forth above. "Heteroarylene" refers to divalent aromatic groups containing one or more heteroatoms (e.g., N, O, P, S, or Si) as part of the ring structure, and having 3 up to 14 carbon atoms; and "substituted arylene" refers to arylene groups further having one or more substituents as set forth above. "Polyheteroarylene" refers to a divalent moiety comprising 2-4 heteroarylene groups (each containing at least one heteroatom, and 3-14 carbon atoms), wherein the heteroarylene groups are linked to one another directly, or via a 1-3 atom linker; and "substituted polyheteroarylene" refers to polyheteroarylene groups further having one or more substituents as set forth above. "(Meth)acrylate" refers collectively to acrylate and methacrylate.

All references are incorporated herein by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method comprising:
combining an organic soluble Group 8 to Group 11 transition metal catalyst precursor, wherein the organic soluble Group 8 to Group 11 transition metal catalyst precursor includes a chelating ligand and a labile ligand, with a surfactant in an aqueous solution to form a water soluble catalyst precursor wherein the surfactant comprises hydrophilic segment which comprises a polyalkylene glycol and a hydrophobic segment, wherein the organic soluble Group 8 to Group 11 transition metal catalyst precursor has the formula

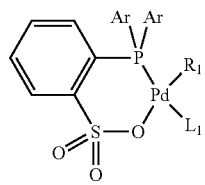

wherein $L_1$ is dimethyl sulfoxide, $R_1$ is methyl and Ar is an aromatic ring having alkoxy substitution wherein the alkoxy group has from 1 to 5 carbon atoms:
the surfactant has the formula

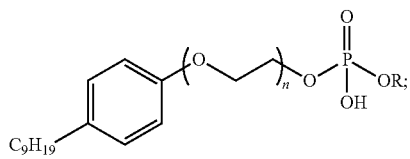

where n is about 12-14 and R is H, an alkali metal cation, or a quaternary ammonium ion; and the water soluble catalyst precursor has the formula

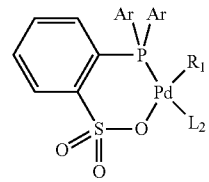

wherein $L_2$ is a residue of the surfactant comprising polalkylene glycol hydrophilic segment a hydrocarbyl hydrophobic segment, $R_1$ is methyl and Ar is an aromatic ring having alkoxy substitution wherein the alkoxy group has from 1 to 5 carbon atoms.

2. The method of claim 1 wherein the surfactant complexes with the organic soluble Group 8 to Group 11 transition metal catalyst by ligand substitution with the labile ligand.

3. The method of claim 1 further comprising contacting one or more monoethylenically unsaturated monomers with the water soluble catalyst precursor under polymerization conditions to form a polyolefin.

4. The method of claim 3, wherein the aqueous solution has a pH of about 2 to about 6.

5. The method of claim 3, wherein either the concentration of the surfactant in the aqueous solution is about 3 gram/liter to 100 gram/liter or the concentration of the catalyst precursor in the aqueous solution is about 0.0.01 µmol/liter to 21 µmol/liter or both.

6. The method of claim 3, wherein the monoethylenically unsaturated monomer is selected from the group consisting of ethylene, propylene, octene, or a combination thereof.

7. The method of claim 3, wherein the catalyst does not show decay in activity for at least 1.5 hour from start of the polymerization reaction and/or shows less than 36% loss of activity after 6 hours from start of the polymerization reaction.

* * * * *